US012615690B2

(12) United States Patent
Baek et al.

(10) Patent No.: US 12,615,690 B2
(45) Date of Patent: Apr. 28, 2026

(54) METHOD AND DEVICE FOR SECURITY MBS COMMUNICATION IN WIRELESS COMMUNICATION SYSTEM

(71) Applicant: Samsung Electronics Co., Ltd., Gyeonggi-do (KR)

(72) Inventors: Sangkyu Baek, Gyeonggi-do (KR); Hyunjeong Kang, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 483 days.

(21) Appl. No.: 17/914,934

(22) PCT Filed: Mar. 29, 2021

(86) PCT No.: PCT/KR2021/003859
§ 371 (c)(1),
(2) Date: Sep. 27, 2022

(87) PCT Pub. No.: WO2021/194324
PCT Pub. Date: Sep. 30, 2021

(65) Prior Publication Data
US 2023/0111248 A1 Apr. 13, 2023

(30) Foreign Application Priority Data
Mar. 27, 2020 (KR) ........................ 10-2020-0037803

(51) Int. Cl.
*H04W 76/40* (2018.01)
*H04L 12/18* (2006.01)
*H04W 4/06* (2009.01)
(52) U.S. Cl.
CPC ............. *H04W 76/40* (2018.02); *H04W 4/06* (2013.01); *H04L 12/189* (2013.01)

(58) Field of Classification Search
CPC ........ H04L 12/189; H04W 4/06; H04W 4/08; H04W 12/03; H04W 12/033; H04W 12/106; H04W 76/40
See application file for complete search history.

(56) References Cited

U.S. PATENT DOCUMENTS 10,536,926 B2 1/2020 Wang et al.
11,032,740 B2 6/2021 Jo et al.
(Continued)

FOREIGN PATENT DOCUMENTS

CN 110731097 1/2020
KR 1020150091267 8/2015
(Continued)

OTHER PUBLICATIONS

"3GPP TS 38.323 V15.6.0: 3rd Generation Partnership Project; Technical Specification Group Radio Access Network; NR; Packet Dat Convergence Protocol (PDCP) specification (Release 15)," 3GPP, published Jun. 2019—pp. 1-26 (Year: 2019).*
(Continued)

*Primary Examiner* — Thomas R Cairns
*Assistant Examiner* — Kai Chang
(74) *Attorney, Agent, or Firm* — The Farrell Law Firm, P.C.

(57) ABSTRACT

Provided are a method and apparatus for security multicast and broadcast service (MBS) communication in a wireless communication system. An operating method of a terminal in a wireless communication system includes receiving configuration information to be applied to MBS data from a base station, and receiving the MBS data based on the configuration information, wherein the configuration information is for configuring an initial value of a state variable corresponding to the MBS data.

14 Claims, 8 Drawing Sheets

(56) References Cited

U.S. PATENT DOCUMENTS

| | | | | |
|---|---|---|---|---|
| 11,412,405 | B2 | 8/2022 | Kim et al. | |
| 2018/0192255 | A1 | 7/2018 | Guo et al. | |
| 2019/0044880 | A1* | 2/2019 | Yi | H04L 47/624 |
| 2019/0053098 | A1* | 2/2019 | Jo | H04W 28/06 |
| 2019/0053112 | A1* | 2/2019 | Wu | H04W 36/0069 |
| 2019/0053122 | A1* | 2/2019 | Wu | H04L 47/34 |
| 2019/0053310 | A1* | 2/2019 | Wu | H04W 76/15 |
| 2019/0297502 | A1* | 9/2019 | Jo | H04W 88/023 |
| 2020/0092719 | A1 | 3/2020 | Kim et al. | |
| 2020/0100142 | A1 | 3/2020 | Kim | |
| 2020/0128419 | A1 | 4/2020 | Van Lieshout et al. | |
| 2020/0137820 | A1* | 4/2020 | Kim | H04W 4/70 |
| 2020/0196189 | A1* | 6/2020 | Jo | H04W 76/19 |
| 2021/0007000 | A1* | 1/2021 | Kim | H04W 28/0273 |
| 2021/0099883 | A1* | 4/2021 | Jo | H04W 12/106 |
| 2021/0100063 | A1* | 4/2021 | Sharma | H04W 8/245 |
| 2021/0267003 | A1* | 8/2021 | Cho | H04W 80/02 |
| 2022/0131944 | A1* | 4/2022 | Yao | H04L 69/28 |
| 2023/0144243 | A1* | 5/2023 | Jin | H04W 4/40 |
| | | | | 370/329 |

FOREIGN PATENT DOCUMENTS

| | | |
|---|---|---|
| KR | 1020180080989 | 7/2018 |
| KR | 10-2027352 | 10/2019 |
| KR | 10-2056196 | 12/2019 |
| KR | 1020210115470 | 9/2021 |

OTHER PUBLICATIONS

Samsung, "Initial Value of RX_DELIV and RX_NEXT", R2-2001499, 3GPP TSG-RAN2 Meeting #109-e, Feb. 24-Mar. 6, 2020, 4 pages.
European Search Report dated Aug. 2, 2023 issued in counterpart application No. 21776888.6-1218, 8 pages.
Samsung, "Initial Value of RX_DELIV", R2-1915339, 3GPP TSG-RAN2 Meeting #108, Nov. 18-22, 2019, 3 pages.
Korean Office Action dated Oct. 24, 2024 issued in counterpart application No. 10-2020-0037803, 4 pages.
CATT, "[Draft] LS on NR V2X Security Issue and PDCP SN Size", R2-1916453, 3GPP TSG-RAN WG2 Meeting #108, Nov. 18-22, 2019, 1 page.
CATT, "Summary of Offline [Offline-812] on HFN part of RX_NEXT and RX_DELIV", R2-1916452, 3GPP TSG-RAN WG2 #108, Nov. 18-22, 2019, 6 pages.
International Search Report dated Jun. 25, 2021 issued in counterpart application No. PCT/KR2021/003859, 13 pages.
KR Notice of Allowance dated Jun. 24, 2025 issued in counterpart application No. 10-2020-0037803, 9 pages.
Chinese Office Action dated Jul. 9, 2025 issued in counterpart application No. 202180025010.9, 15 pages.
CMCC, "Introducing Transmission Mode for PDCP Operation", R2-1702925, 3GPP TSG-RAN WG2 Meeting #97bis, Apr. 3-7, 2017, 3 pages.
Chinese Office Action dated Feb. 4, 2026 issued in counterpart application No. 202180025010.9, 5 pages.

* cited by examiner

METHOD AND DEVICE FOR SECURITY MBS COMMUNICATION IN WIRELESS COMMUNICATION SYSTEM

PRIORITY

This application is a National Phase Entry of PCT International Application No. PCT/KR2021/003859, which was filed on Mar. 29, 2021, and claims priority to Korean Patent Application Nos. 10-2020-0037803, which was filed on Mar. 27, 2020, the entire content of each of which is incorporated herein by reference.

TECHNICAL FIELD

The present disclosure relates to a wireless communication system, and more particularly, to a method and apparatus for security multicast and broadcast service (MBS) communication in a wireless communication system.

BACKGROUND ART

To meet the increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mmWave) band (e.g., a 60 GHz (80 GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the above features and the development of wireless communication systems, methods for seamlessly providing services related to multicast and broadcast are particularly required.

DESCRIPTION OF EMBODIMENTS

Technical Problem

Described embodiments provide an apparatus and method capable of effectively supporting a service in a mobile communication system.

Solution to Problem

According to an embodiment of the present disclosure, an operating method of a terminal in a wireless communication system includes receiving configuration information to be applied to multicast and broadcast service (MBS) data from a base station, and receiving the MBS data based on the configuration information, wherein the configuration information is for configuring an initial value of a state variable corresponding to the MBS data.

The receiving of the configuration information from the base station may include receiving the configuration information while the MBS data is broadcast or multicast from the base station.

The configuration information may include at least one of an RX_DELIV value, an RX_NEXT value, a COUNT value, or a hyper frame number (HFN) value.

The operating method may further include identifying an HFN value of a first-received MBS data packet among the MBS data based on the RX_DELIV value or the RX_NEXT value.

The operating method may further include identifying, based on the HFN value, a COUNT value of a first-received MBS data packet among the MBS data.

According to an embodiment of the present disclosure, an operating method of a base station in a wireless communication system includes broadcasting or multicasting multicast and broadcast service (MBS) data to a terminal, and transmitting, to the terminal, configuration information to be applied to a first MBS data packet received by the terminal among the MBS data, wherein the configuration information is for configuring an initial value of a state variable corresponding to the first MBS data packet.

The configuration information may include at least one of an RX_DELIV value, an RX_NEXT value, a COUNT value, or a hyper frame number (HFN) value.

The initial value may be determined by an HFN value identified based on the RX_DELIV value or the RX_NEXT value.

The initial value may be determined by a COUNT value identified based on the HFN value.

According to an embodiment of the present disclosure, a terminal in a wireless communication system includes a transceiver, and at least one processor coupled with the transceiver, wherein the at least one processor is configured to receive configuration information to be applied to multicast and broadcast service (MBS) data from a base station, and receive the MBS data based on the configuration information, wherein the configuration information is for configuring an initial value of a state variable corresponding to the MBS data.

The at least one processor may be configured to receive the configuration information while the MBS data is broadcast or multicast from the base station.

The configuration information may include at least one of an RX_DELIV value, an RX_NEXT value, a COUNT value, or a hyper frame number (HFN) value.

The at least one processor may be configured to identify an HFN value of a first-received MBS data packet among the MBS data based on the RX_DELIV value or the RX_NEXT value.

The at least one processor may be configured to identify, based on the HFN value, a COUNT value of a first-received MBS data packet among the MBS data.

According to an embodiment of the present disclosure, a base station in a wireless communication system includes a transceiver, and at least one processor coupled with the transceiver, wherein the at least one processor is configured to broadcast or multicast multicast and broadcast service (MBS) data to a terminal, and transmit, to the terminal, configuration information to be applied to a first MBS data packet received by the terminal among the MBS data, wherein the configuration information is for configuring an initial value of a state variable corresponding to the first MBS data packet.

MODE OF DISCLOSURE

Figure 1:
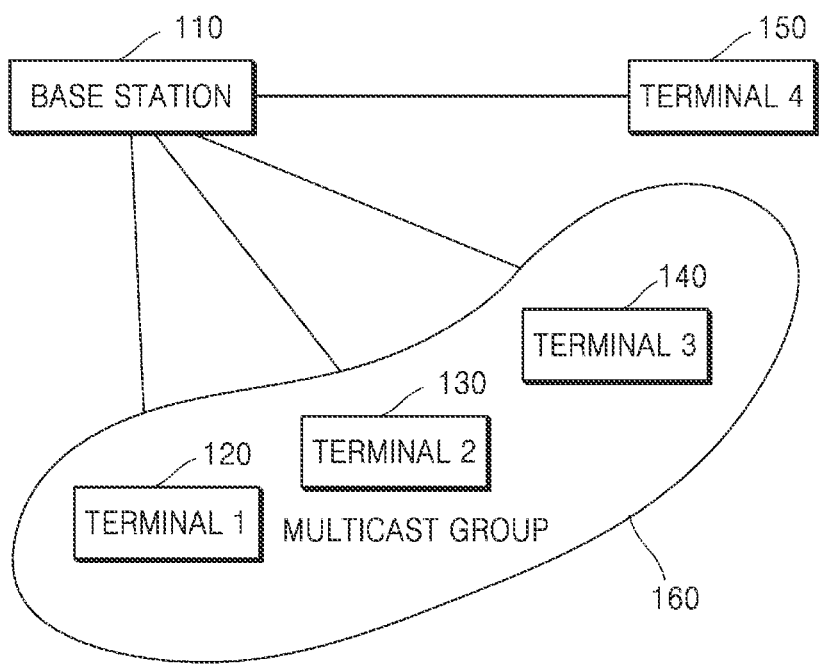
FIG. 1 is a diagram illustrating an operating method of MBS communication according to an embodiment of the present disclosure.

Hereinafter, operation principles of the present disclosure will be described in detail with reference to the accompanying drawings. In the following description of the present disclosure, detailed descriptions of well-known functions or configurations will be omitted because they would unnecessarily obscure the subject matters of the present disclosure. Also, terms described below may be terms defined considering functions in the present disclosure and may vary according to users' or operators' intentions or practices. Therefore, the definition thereof should be made based on the content throughout the specification.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the present disclosure and the accomplishing methods thereof will become apparent from the embodiments of the present disclosure described below in detail with reference to the accompanying drawings. The present disclosure may, however, be embodied in many different forms and should not be construed as being limited to the embodiments of the present disclosure described below; rather, the embodiments are provided to complete the present disclosure and fully convey the scope of the present disclosure to those of ordinary skill in the art and the present disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be directed to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "unit" used in the present embodiments may refer to a software component or a hardware component such as a field programmable gate array (FPGA) or an application specific integrated circuit (ASIC) and the "unit" may perform certain functions. However, the "unit" is not limited to software or hardware. The "unit" may be configured to be in an addressable storage medium or may be configured to operate one or more processors. Thus, as an example, the "unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "units" may be associated with the smaller number of components and "units" or may be further divided into additional components and "units". In addition, the components and "units" may be implemented to operate one or more central processing units (CPUs) in a device or a security multimedia card. Also, in embodiments, the "unit" may include one or more processors.

In the following description of the present disclosure, detailed descriptions of well-known functions or configurations will be omitted because they would unnecessarily obscure the subject matters of the present disclosure. Hereinafter, embodiments of the present disclosure will be described with reference to the accompanying drawings.

In the following description, terms for identifying access nodes, terms referring to network entities, terms referring to messages, terms referring to interfaces between network entities, terms referring to various identification information, and the like are used for convenience of descriptions. Thus, the present disclosure is not limited to the terms used below and other terms referring to objects having equivalent technical meanings may be used.

Hereinafter, a base station may be an agent performing terminal resource allocation and may be at least one of a gNode B, an eNode B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. Also, the term "terminal" may refer to other wireless communication devices in addition to mobile phones, NB-IoT devices, and sensors. However, the base station and the terminal are not limited thereto.

Hereinafter, for convenience of descriptions, the present disclosure uses terms and names defined in the 3rd Generation Partnership Project Long Term Evolution (3GPP LTE) standards and/or 3rd Generation Partnership Project New Radio (NR). However, the present disclosure is not limited to those terms and names and may be equally applied to systems according to other standards. In the present disclosure, eNB may be used interchangeably with gNB for convenience of descriptions. That is, a base station described as an eNB may represent a gNB.

Particularly, the present disclosure may be applied to 3GPP NR (5G mobile communication standards). Also, the present disclosure may be applied to intelligent services (e.g., smart home, smart building, smart city, smart car or connected car, health care, digital education, retail business, security, and safety-related services) based on 5G communication technology and IoT technology. In the present disclosure, eNB may be used interchangeably with gNB for convenience of descriptions. That is, a base station described as an eNB may represent a gNB. Also, the term "terminal" may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to an embodiment, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved Multi Input Multi Output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km²) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of 10-5 or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the present disclosure is applied are not limited thereto.

Also, although embodiments of the present disclosure will be described below by using an LTE, LTE-A, LTE Pro, or 5G (or NR, next-generation mobile communication) as an example, the embodiments of the present disclosure may also be applied to other communication systems having similar technical backgrounds or channel forms. Also, the embodiments of the present disclosure may also be applied to other communication systems through some modifications without departing from the scope of the present disclosure by the judgment of those of ordinary skill in the art.

Hereinafter, embodiments of the present disclosure will be described with reference to the accompanying drawings.

FIG. 1 is a diagram illustrating an operating method of MBS communication according to an embodiment of the present disclosure. Multicast and broadcast service (MBS) communication may refer to a method by which one transmitting apparatus communicates with several receiving apparatuses in a mobile communication system. Here, the transmitting apparatus may be a base station, and each receiving apparatus may be a terminal. However, the present disclosure is not limited thereto, and the transmitting apparatus may be a terminal.

FIG. 1 illustrates an example of MBS communication in which a base station (gNB) 110 is a transmitting apparatus and terminals 120, 130, 140, and 150 are receiving apparatuses. The MBS communication may be a broadcast for a plurality of unspecified receiving apparatuses or may be a multicast for a plurality of particular receiving apparatuses. When communication is performed in a multicast manner, the base station may configure only a particular terminal to receive a corresponding multicast packet. For this purpose, a set of terminals to perform a particular multicast communication may be configured and will be referred to as a multicast group 160 in the embodiment of FIG. 1.

By being allocated the same group-radio network temporary identity (G-RNTI) from the base station 110, the terminals 120, 130, and 140 in the multicast group 160 may receive data allocated for the G-RNTI. In the embodiment of FIG. 1, it is assumed that a terminal 1 120, a terminal 2 130, and a terminal 3 140 are configured as one multicast group 160 and allocated the G-RNTI to receive data from the base station 110 in a multicast manner. Because a terminal 4 150 is not included in the multicast group, the terminal 4 150 may not be allocated the G-RNTI and accordingly the terminal 4 150 may not receive the data that the terminal 1 120, the terminal 2 130, and the terminal 3 140 receive from the base station.

One or more multicast groups may be configured in the coverage of the base station 110, and each multicast group may be identified by the G-RNTI. One terminal may be allocated one or more G-RNTIs from the base station 110. Not only in the connected mode (RRC CONNECTED MODE) but also in the idle mode (RRC IDLE MODE) or the inactive mode (RRC INACTIVE MODE), the terminal may receive multicast data by using the G-RNTI value allocated in the connected mode. The G-RNTI may be configured in the terminal by being included in at least one of RRC reconfiguration, RRC establishment (setup), and RRC reestablishment messages that the terminal may receive in the connected mode. However, the present disclosure is not limited thereto, and the G-RNTI may be transmitted from the base station by being included in a system information block (SIB) as a G-RNTI value that the terminal may receive. The terminal configured with the G-RNTI value according to one or more of the various methods described above may apply the G-RNTI value after being configured with the G-RNTI value.

Figure 2:
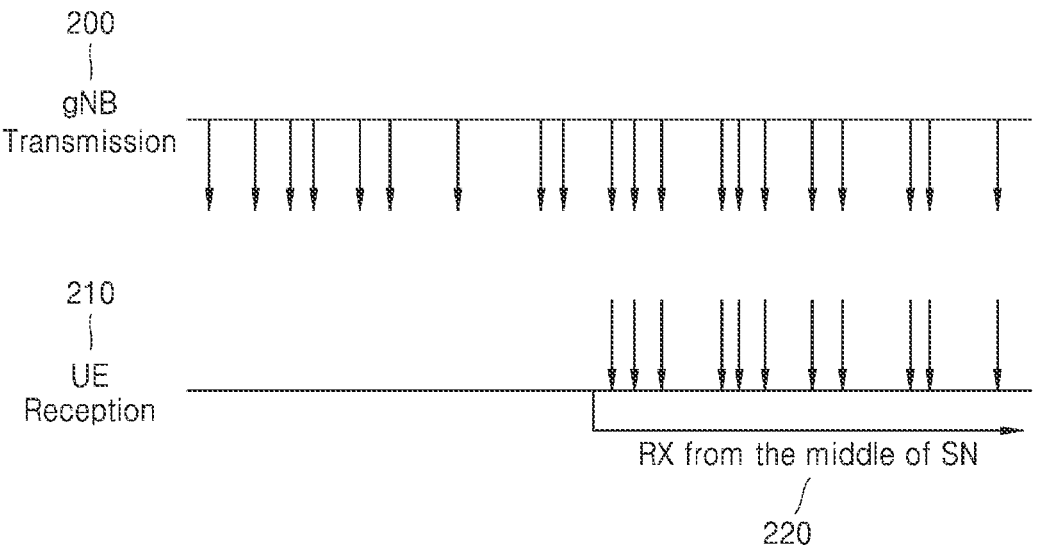
FIG. 2 is a diagram illustrating an operation in which a terminal receives data for MBS communication from the middle of transmission data, according to an embodiment of the present disclosure.

FIG. 2 is a diagram illustrating an operation in which a terminal receives data for MBS communication from the middle of transmission data, according to an embodiment of the present disclosure. The MBS communication may be a communication method by which a plurality of terminals receive the same data from a base station 200. Whether a terminal will receive data for a particular MBS communication may be determined according to whether the terminal is interested in data of the MBS communication. However, all terminals may not receive the data of the MBS communication simultaneously. For example, by establishing an RRC connection with the base station 200 at a time later than when other terminals receive information about MBS communication from the base station 200, a terminal 210 may receive the information about the MBS communication later than the other terminals. In this case, the reception time of the terminal 210 with respect to data for MBS communication may be delayed. That is, there may be a case in which the terminal 210 receives data transmitted from the base station 200 for MBS communication, from the middle without receiving the data from the beginning. As another example, due to the mobility of the terminal 210, the terminal 210 may perform handover to the coverage of a base station other than the base station 200. In this case, in the coverage of the base station 200, because the reception time of the data for the MBS communication desired by the terminal 210 may be after the handover, the terminal 210 may receive the data from a time different from the time when another terminal receives the data for the MBS communication from the base station 200. For example, referring to FIG. 2, the base station 200 transmitting data of MBS communication may transmit data associated with a certain MBS communication, and the terminal 210 attempting to receive data for MBS communication may not receive the data transmitted by the base station from the beginning due to various reasons. Alternatively, the terminal 210 may perform data reception for MBS communication after obtaining reception information for MBS communication. This may mean that the packet may be received (220) from the middle of the sequence number in the packet data convergence protocol (PDCP) layer. Receiving the packet from the middle of the sequence number as such may mean that the existing unicast transmission/reception procedure of configuring the initial value of the sequence number as 0 may not be used. Particularly, when a security function such as ciphering and integrity protection should be performed, a COUNT value corresponding to a combination of a sequence number value and a hyper frame number (HFN) value should match with respect to the packet transmitted between the base station 200 as a transmitting apparatus and the terminal 210 as a receiving apparatus. The present disclosure proposes a method of configuring an HFN value and a COUNT value of a packet between a base station and a terminal in order to perform a security function in MBS communication.

Figure 3:
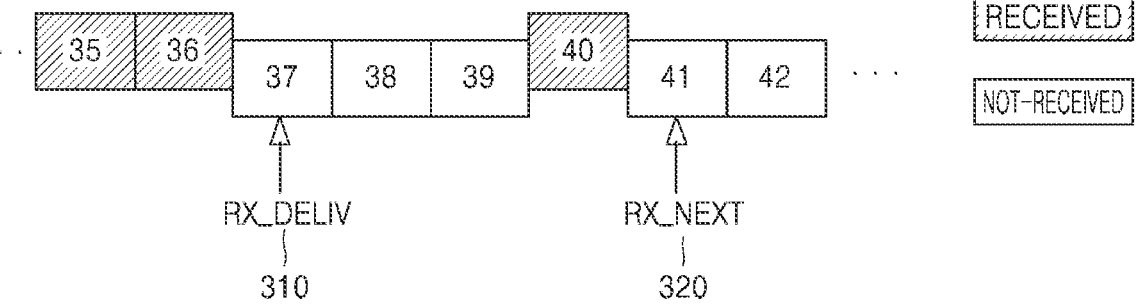
FIG. 3 is a diagram illustrating a method of configuring RX_DELIV and RX_NEXT that are state variables of a PDCP layer.

FIG. 3 is a diagram illustrating a method of configuring RX_DELIV and RX_NEXT that are state variables of a PDCP layer. A receiving operation of the PDCP layer may be performed through a process of updating the value of a state variable representing the COUNT value of a packet. The main state variables used in this case may include RX_DELIV and RX_NEXT. RX_DELIV may represent the COUNT value of a packet with the smallest COUNT value among the packets that have not been transmitted to the upper layer of the PDCP layer but are still waiting for reception in the PDCP layer. RX_NEXT may be the COUNT value of a packet expected to be received in the next PDCP layer and may be configured as a value obtained by adding 1 to the greatest COUNT value among the COUNT values of the packets received up to now.

FIG. 3 illustrates an example in which RX_DELIV and RX_NEXT are configured. It is assumed that packets corresponding to COUNT values 35, 36, and 40 have been received at the time of FIG. 3. However, it is assumed that packets corresponding to COUNT values 37, 38, 39, 41, 42, and higher values have not been received. In this case, the PDCP layer may sequentially transmit the received packets up to COUNT 36 to the upper layer. However, in order to wait for the packets corresponding to the COUNT values 37, 38, and 39, which are non-received packets with COUNT values less than 40, the packet corresponding to the COUNT value 40, which has been received, may be queued in a PDCP reception buffer without being transmitted to the upper layer. In this case, RX_NEXT 320 may be configured as 41 that is a value obtained by adding 1 to the COUNT value of the packets received up to now. This may be because the packet corresponding to the COUNT value of 41 is expected to arrive at the next PDCP layer. Also, 37 having the smallest COUNT value among the packets that have not been received up to now may be configured as RX_DELIV 310. That the RX_DELIV value and the RX_NEXT value are different may indicate that there is a packet currently stored in the PDCP reception buffer and the PDCP layer is waiting for a packet having a smaller COUNT value than the stored packet. FIG. 3 illustrates a situation in which the PDCP layer should wait for the reception of the packets corresponding to the COUNT values 37, 38, and 39 because the packet corresponding to COUNT 40 has arrived but the packets corresponding to COUNT 37, 38, and 39 have not yet arrived. For this purpose, the PDCP layer may start a reordering timer, configure the RX_NEXT value as an RX_REORD state variable, and wait for the reception of a packet less than or equal to the RX_REORD value during the reordering timer period. In the case of the terminal performing data reception for MBS communication, it may be necessary to determine which RX_DELIV and RX_NEXT values to use when starting MBS communication. For example, the terminal may need to determine which RX_DELIV and RX_NEXT values to use in order to prevent an unintentional packet loss or prevent a delay time increase due to packet reordering.

Figure 4:
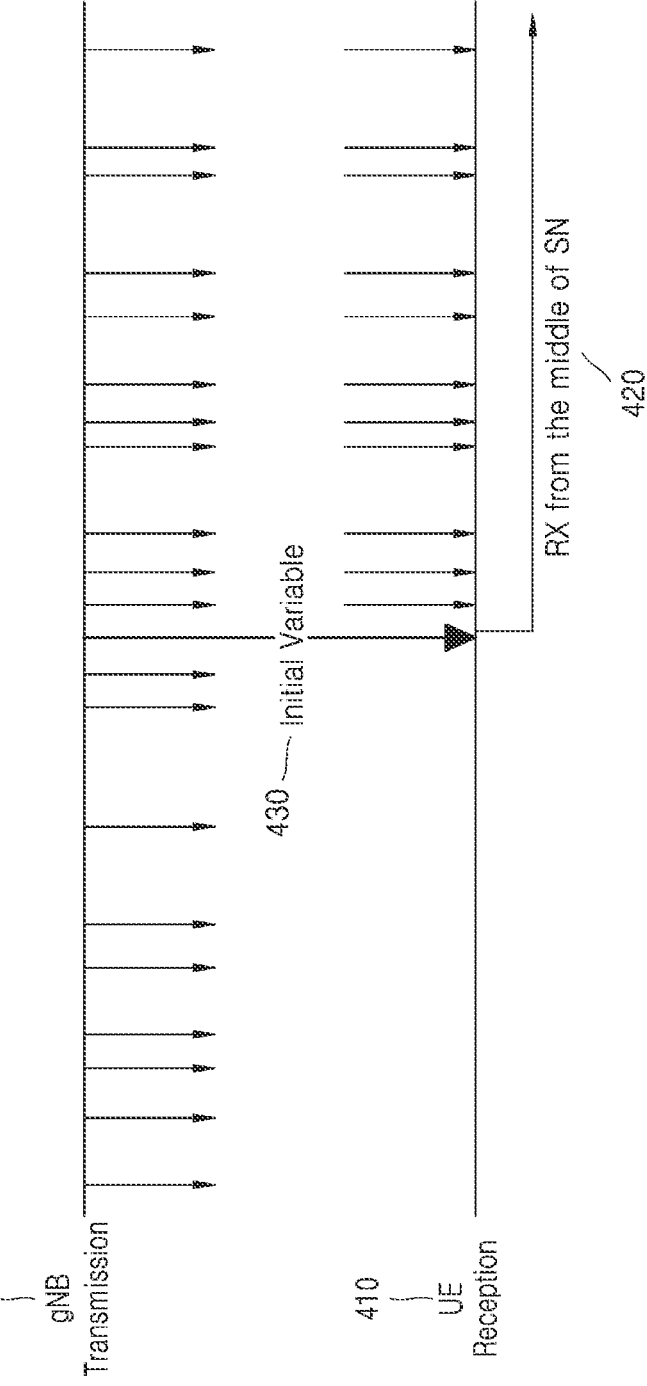
FIG. 4 is a diagram illustrating an operation in which a terminal receives data for MBS communication from the middle of transmission data, according to an embodiment of the present disclosure.

FIG. 4 is a diagram illustrating an operation in which a terminal receives data for MBS communication from the middle of transmission data, according to an embodiment of the present disclosure. The MBS communication may be a communication method by which a plurality of terminals receive the same data from a base station 400. Whether a terminal will receive data for a particular MBS communication may be determined according to whether the terminal is interested in data of the MBS communication. However, all terminals may not receive the data of the MBS communication simultaneously. For example, by establishing an RRC connection with the base station 400 at a time later than when other terminals receive information about MBS communication from the base station 400, a terminal 410 may receive the information about the MBS communication later than the other terminals. In this case, the reception time of the terminal 410 with respect to data for MBS communication may be delayed. That is, there may be a case in which the terminal 410 receives data transmitted from the base station 400 for MBS communication, from the middle without receiving the data from the beginning. As another example, due to the mobility of the terminal 410, the terminal 410 may perform handover to the coverage of a base station other than the base station 400. In this case, in the coverage of the base station 400, because the reception time of the data for the MBS communication desired by the terminal 410 may be after the handover, the terminal 410 may receive the data from a time different from the time when another terminal receives the data for the MBS communication from the base station 400. For example, referring to FIG. 4, the base station 400 transmitting data of MBS communication may transmit data about a certain MBS communication, and the terminal 410 attempting to receive data for MBS communication may not receive the data transmitted by the base station from the beginning due to various reasons. Alternatively, the terminal 410 may perform data reception for MBS communication after obtaining reception information for MBS communication. This may mean that the packet may be received (420) from the middle of the sequence number in the packet data convergence protocol (PDCP) layer. Receiving the packet from the middle of the sequence number as such may mean that the existing unicast transmission/reception procedure of configuring the initial value of the sequence number as 0 may not be used. Particularly, when a security function such as ciphering and integrity protection should be performed, a COUNT value corresponding to a combination of a sequence number value and a hyper frame number (HFN) value should match with respect to the packet transmitted between the base station 400 as a transmitting apparatus and the terminal 410 as a receiving apparatus.

According to an embodiment of the present disclosure, in order to match the above COUNT value, before the terminal 410 receives data for MBS communication, the base station 400 may notify an initial state variable value that should be used by the terminal 410 or a variable value 430 that may be used to derive the initial state variable value. For example, the initial state variable value may be at least one of RX_DELIV and RX_NEXT values that should be configured and used by the terminal 410. Alternatively, in order for the terminal 410 to derive the RX_DELIV value or the RX_NEXT value, the base station 400 may notify the terminal 410 of an HFN value about a received packet, which the terminal 410 first receives as data for MBS communication, as an initial variable value. The initial state variable or the variable value that may be used to derive the initial state variable value may be configured for each PDCP entity, and the PDCP entity may be a radio bearer that may provide an MBS service or may perform point-to-multipoint (PTM) transmission. The radio bearer capable of providing an MBS service or performing PTM transmission as such may be referred to as a PTM data radio bearer (DRB). However, in another embodiment, it may be referred to as another name such as MBS DRB, MBS RB, or MBS radio bearer (MRB). The terminal 410 may perform a procedure of receiving a packet from the base station 400 from the middle of the sequence number by using the received initial state variable value or the variable value 430 that may be used to derive the initial state variable value. According to an embodiment of the present disclosure, in order to receive data for MBS communication from the base station 400, the terminal 410 may transmit a message for requesting an MBS service to the base station 400. For example, the message for requesting an MBS service may include MBS service request information and/or list information of an MBS service of interest. When the base station 400 receives the message for requesting an MBS service from the terminal 410, the base station 400 may transmit a message for configuring an MBS service to the terminal 410. The message for configuring an MBS service may include MBS service configuration information for the terminal 410 to receive data for MBS communication. The MBS service configuration information may include the above initial state variable value or the variable value 430 that may be used to derive the initial state variable value. Also, the message for configuring an MBS service may be transmitted in a unicast manner. The terminal 410 may perform security MBS communication with the base station 400 by applying the MBS service configuration information received from the base station 400 to the terminal 410.

According to an embodiment of the present disclosure, a procedure in which the terminal 410 receives the packet from the base station 400 from the middle of the sequence number by using the initial state variable value or the variable value 430 that may be used to derive the initial state variable value may be performed with reference to the description in FIG. 3. For example, the terminal 410 having obtained the initial state variable value may start a reordering timer in the PDCP layer in the terminal 410, configure the obtained RX_NEXT value as the RX_REORD state variable, and may wait for the reception of a packet less than or equal to the RX_REORD value during the reordering timer period. As described above, the terminal 410 may prevent an unintended packet loss and prevent a delay time increase due to packet reordering by being configured by the base station 400 with the initial state variable value for MBS service or the variable value 430 that may be used to derive the initial state variable value.

Figure 5:
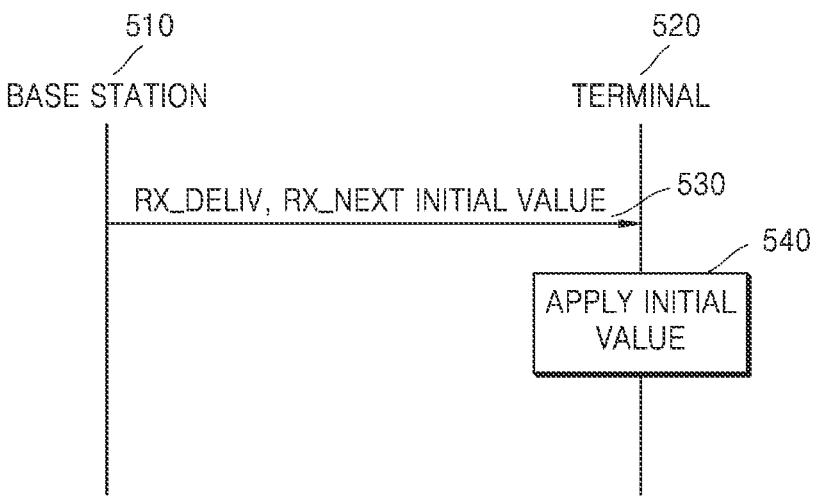
FIG. 5 illustrates a method by which a base station configures an initial value of a state variable for a terminal performing MBS communication, according to an embodiment of the present disclosure.

FIG. 5 illustrates a method by which a base station configures an initial value of a state variable for a terminal performing MBS communication, according to an embodiment of the present disclosure. When a terminal 520 intends to receive data for MBS communication or to change a configuration about data for MBS communication that is being received, a base station 510 may transmit configuration information about MBS communication to the terminal 520 to allow the terminal 520 to apply the configuration information about MBS communication. However, in some cases, the terminal 520 receiving the data for MBS communication may receive the data from the middle of the sequence number. Thus, by allowing the base station 510 to transmit, to the terminal 520, the initial value of a state variable to be used by the terminal 520 to receive data for MBS communication, it may be necessary to prevent an unintended packet loss and prevent a delay time increase due to packet reordering when the terminal 520 transmits/receives data from the middle of the packet. The method according to an embodiment of the present disclosure described with reference to FIG. 5 may prevent a packet loss and a delay time increase.

Referring to FIG. 5, in an embodiment of the present disclosure, in operation 530, the base station 510 may configure the terminal 520 with the initial value of RX_DELIV and RX_NEXT of the PDCP layer used by the terminal 520 to receive data for MBS communication. Because both RX_DELIV and RX_NEXT are state variables of the COUNT value, they may have an HFN portion and a sequence number portion. According to an embodiment of the present disclosure, the transmitted RX_DELIV initial value may be equal to or less than the RX_NEXT initial value. However, the difference between the RX_DELIV value and the RX_NEXT value may not be greater than (or cannot be greater than) the length of a PDCP reception window. For example, when the length of the reception window is $2^{\wedge}$(the number of bits of the sequence number size−1), the RX_DELIV and RX_NEXT values may not be greater than (or cannot be greater than) the length of the reception window.

In an embodiment of the present disclosure, the base station 510 may transmit all the COUNT values with respect to the RX_DELIV value to the terminal 520 and configure only a difference value from RX_DELIV with respect to the RX_NEXT value. For example, when the initial value of RX_DELIV has a COUNT value of 15 and the difference from RX_NEXT is 3, RX_NEXT may be configured as a value of 18 obtained by adding 3 to 15. Alternatively, the base station 510 may transmit all the COUNT values with respect to the RX_NEXT value to the terminal 520 and configure only a difference value from RX_NEXT with respect to the RX_DELIV. For example, when the initial value of RX_NEXT has a COUNT value of 18 and the difference from RX_NEXT is 3, RX_DELIV may be configured as a value of 15 obtained by subtracting 3 from 18.

According to an embodiment of the present disclosure, the initial value of RX_DELIV and RX_NEXT may be configured for each point-to-multipoint data radio bearer (PTM DRB) that is a DRB performing MBS communication. Also, when the initial RX_DELIV and RX_NEXT value is not configured for a certain PTM DRB, the terminal 520 may configure the initial value of RX_DELIV and RX_NEXT as 0 with respect to the certain PTM DRB. In another embodiment, when the initial RX_DELIV and RX_NEXT value is not configured for a certain PTM DRB, the terminal 520 may configure, with respect to the certain PTM DRB, the initial value of RX_NEXT as a remainder value after dividing a value, which is obtained by adding 1 to the sequence number of the packet first received in the PTM DRB, by the total sequence number size ($2^{\wedge}$(the number of bits of the sequence number size)). Also, the initial value of RX_DELIV may be configured as a remainder value after dividing a value, which is obtained by subtracting the half size of the PDCP reception window from the sequence number of the first received packet, by the total sequence number size ($2^{\wedge}$(the number of bits of the sequence number size)). In operation 540, the terminal 520 may apply the RX_DELIV and RX_NEXT value received in operation 530 (or a value of 0 with respect to the PTM DRB in which the initial RX_DELIV and RX_NEXT values is not configured) to receive data for MBS communication afterward. Thereafter, the terminal 520 may transmit, to the base station 510, a configuration completion report message indicating that the configuration of the initial value of the RX_DELIV and RX_NEXT has been accurately received and will be applied to the terminal 520.

Figure 6:
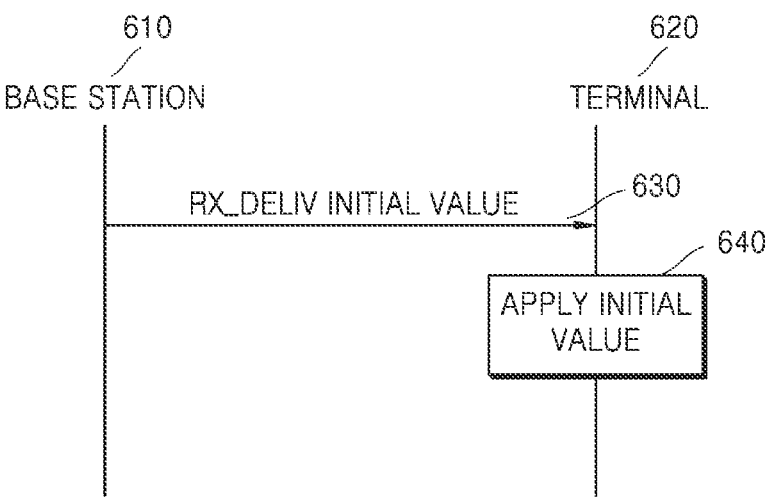
FIG. 6 illustrates a method by which a base station configures an initial value of a state variable for a terminal performing MBS communication, according to an embodiment of the present disclosure.

FIG. 6 illustrates a method by which a base station configures an initial value of a state variable for a terminal performing MBS communication, according to an embodiment of the present disclosure. When a terminal 620 intends to receive data for MBS communication or to change a configuration about data for MBS communication that is being received, a base station 610 may transmit configuration information about MBS communication to the terminal 620 to allow the terminal 620 to apply the configuration information about MBS communication. However, in some cases, the terminal 620 receiving the data for MBS communication may receive the data from the middle of the sequence number. Thus, by allowing the base station 610 to transmit, to the terminal 620, the initial value of a state variable to be used by the terminal 620 to receive data for MBS communication, it may be necessary to prevent an unintended packet loss and prevent a delay time increase due to packet reordering when the terminal 620 transmits/receives data from the middle of the packet. The method according to an embodiment of the present disclosure described with reference to FIG. 6 may prevent a packet loss and a delay time increase.

Referring to FIG. 6, in an embodiment of the present disclosure, in operation 630, the base station 610 may configure the terminal 620 with the initial value of RX_DELIV of the PDCP layer used by the terminal 620 to receive data for MBS communication. Because RX_DELIV is a state variable of the COUNT value, it may have an HFN portion and a sequence number portion. Also, the initial value of the RX_NEXT value may be configured as the same value as RX_DELIV.

According to an embodiment of the present disclosure, the initial value of RX_DELIV may be configured for each point-to-multipoint data radio bearer (PTM DRB) that is a DRB performing MBS communication. Also, when the initial RX_DELIV value is not configured for a certain PTM DRB, the terminal 620 may configure the initial value of RX_DELIV as 0. In another embodiment, when the initial RX_DELIV value and RX_NEXT value are not configured for a certain PTM DRB, the terminal 620 may configure, with respect to the certain PTM DRB, the initial value of RX_NEXT as a remainder value after dividing a value, which is obtained by adding 1 to the sequence number of the packet first received in the PTM DRB, by the total sequence number size ($2^{\wedge}$(the number of bits of the sequence number size)). Also, the initial value of RX_DELIV may be configured as a remainder value after dividing a value, which is obtained by subtracting the half size of the PDCP reception window from the sequence number of the first received packet, by the total sequence number size ($2^{\wedge}$(the number of bits of the sequence number size)). In operation 640, the terminal 620 may apply the RX_DELIV and RX_NEXT value received in operation 630 (or a value of 0 with respect to the PTM DRB in which the initial RX_DELIV and RX_NEXT values is not configured) to receive data for MBS communication afterward. Thereafter, the terminal 620 may transmit, to the base station 610, a configuration completion report message indicating that the configuration of the initial value of the RX_DELIV has been accurately received and will be applied to the terminal 620.

Figure 7:
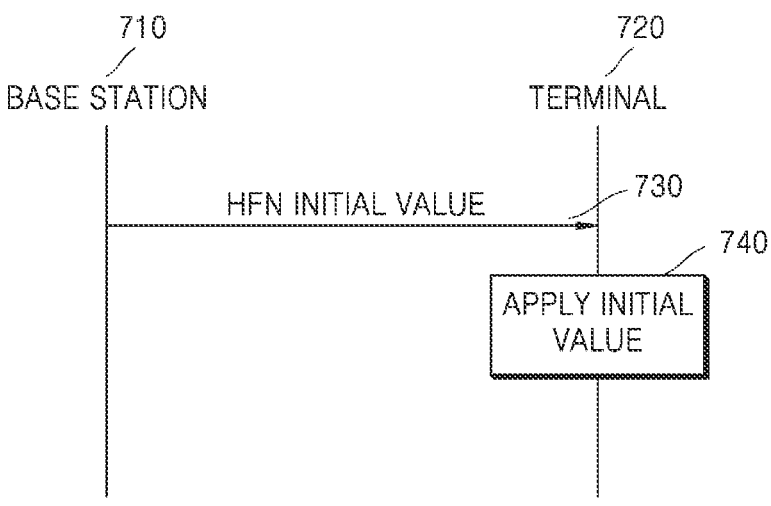
FIG. 7 illustrates a method by which a base station configures an HFN value of a state variable for a terminal performing MBS communication, according to an embodiment of the present disclosure.

FIG. 7 illustrates a method by which a base station configures an HFN value of a state variable for a terminal performing MBS communication, according to an embodiment of the present disclosure. When a terminal 720 intends to receive data for MBS communication or to change a configuration about data for MBS communication that is being received, a base station 710 may transmit configuration information about MBS communication to the terminal 720 to allow the terminal 720 to apply the configuration information about MBS communication. However, in some cases, the terminal 720 receiving the data for MBS communication may receive the data from the middle of the sequence number. Thus, by allowing the base station 710 to transmit, to the terminal 720, the initial value of a state variable to be used by the terminal 720 to receive data for MBS communication, it may be necessary to prevent an unintended packet loss and prevent a delay time increase due to packet reordering when the terminal 720 transmits/receives data from the middle of the packet.

In addition, when ciphering or integrity protection is applied to transmitted/received data, the base station 710 and the terminal 720 may have to use the same value as for an HFN value used for ciphering with respect to each packet. The method according to an embodiment of the present disclosure described with reference to FIG. 7 may prevent a packet loss and a delay time increase and simultaneously perform data ciphering and integrity protection.

Referring to FIG. 7, in an embodiment of the present disclosure, in operation 730, the base station 710 may configure the terminal 720 with the initial value of HFN of the PDCP layer used by the terminal 720 to receive data for MBS communication. By applying the received HFN value, the terminal 720 may determine the initial value of a state variable such as RX_DELIV or RX_NEXT and the HFN value of a packet first received by the terminal 720 as data for MBS communication. The initial value of HFN may be configured for each point-to-multipoint data radio bearer (PTM DRB) that is a DRB performing MBS communication. Also, when the initial HFN value is not configured for a certain PTM DRB, the terminal may configure the initial value of HFN as 0 with respect to the certain PTM DRB. In another embodiment, when the initial RX_DELIV and RX_NEXT value is not configured for a certain PTM DRB, the terminal 720 may configure, with respect to the certain PTM DRB, the initial value of RX_NEXT as a remainder value after dividing a value, which is obtained by adding 1 to the sequence number of the packet first received in the PTM DRB, by the total sequence number size ($2^{\wedge}$(the number of bits of the sequence number size)). Also, the initial value of RX_DELIV may be configured as a remainder value after dividing a value, which is obtained by subtracting the half size of the PDCP reception window from the sequence number of the first received packet, by the total sequence number size ($2^{\wedge}$(the number of bits of the sequence number size)).

According to an embodiment of the present disclosure, in operation 730, the initial value of HFN received by the terminal 720 may be data for MBS communication by the terminal 720 and may be an HFN value of PDCP PDU (or PDCP SDU) first received in a radio bearer performing the MBS communication. The terminal 720 may obtain a COUNT value of the first received packet by combining the HFN value and the sequence number included in the header of the first received packet.

According to an embodiment of the present disclosure, the initial value of HFN received by the terminal 720 in operation 730 may include the HFN value of the initial value of RX_DELIV. The sequence number portion of the initial value of RX_DELIV may be data for MBS communication by the terminal 720 and may be derived from the sequence number of the packet first received in a radio bearer performing the MBS communication. The terminal 720 may obtain a COUNT value of the initial value of RX_DELIV by combining the derived sequence number portion of the initial value of RX_DELIV and the HFN value received in operation 730. The sequence number portion of RX_DELIV may be a remainder value after dividing a value, which is obtained by subtracting a predetermined constant from the sequence number of the first received packet, by $2^{\wedge}$(the number of bits of the sequence number size). Here, the predetermined constant may be half the size of a reordering window.

According to an embodiment of the present disclosure, the initial value of HFN received by the terminal 720 in operation 730 may include the HFN value of the initial value of RX_NEXT. The sequence number portion of the initial value of RX_NEXT may be data for MBS communication by the terminal 720 and may be derived from the sequence number of the packet first received in a radio bearer performing the MBS communication. The terminal 720 may obtain a COUNT value of the initial value of RX_NEXT by combining the derived sequence number portion of the initial value of RX_NEXT and the HFN value received in operation 730.

In operation 740, the terminal 720 may apply the HFN value received in operation 730 to receive data for MBS communication afterward. Thereafter, the terminal 720 may transmit, to the base station 710, a configuration completion report message indicating that the configuration of the initial value of the HFN has been accurately received and will be applied to the terminal 720.

Figure 8:
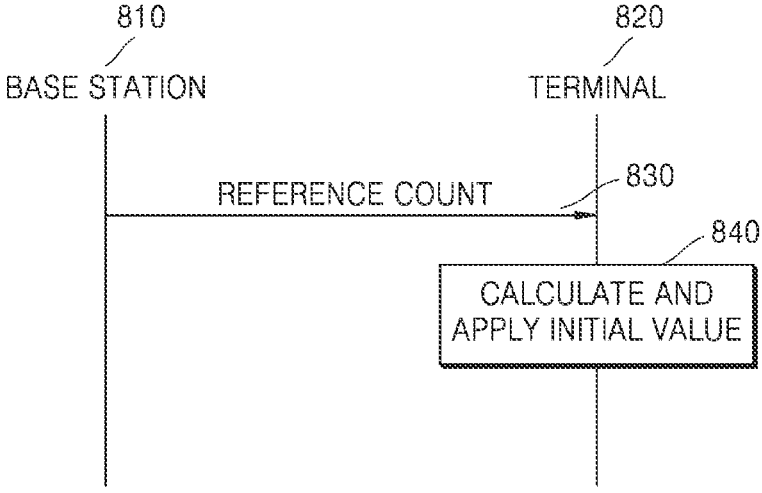
FIG. 8 illustrates a method by which a base station configures a reference count value for a terminal performing MBS communication, according to an embodiment of the present disclosure.

FIG. 8 illustrates a method by which a base station configures a reference count value for a terminal performing MBS communication, according to an embodiment of the present disclosure. When a terminal 820 intends to receive data for MBS communication or to change a configuration about data for MBS communication that is being received, a base station 810 may transmit configuration information about MBS communication to the terminal 820 to allow the terminal 820 to apply the configuration information about MBS communication. However, in some cases, the terminal 820 receiving the data for MBS communication may receive the data from the middle of the sequence number. Thus, by allowing the base station 810 to transmit, to the terminal 820, the initial value of a state variable to be used by the terminal 820 to receive data for MBS communication, it may be necessary to prevent an unintended packet loss and prevent a delay time increase due to packet reordering when the terminal 820 transmits/receives data from the middle of the packet.

In addition, when ciphering or integrity protection is applied to transmitted/received data, the base station 810 and the terminal 820 may have to use the same value as for an HFN value used for ciphering with respect to each packet. The method according to an embodiment of the present disclosure described with reference to FIG. 8 may prevent a packet loss and a delay time increase and simultaneously perform data ciphering and integrity protection.

Referring to FIG. 8, in an embodiment of the present disclosure, in operation 830, the base station 810 may configure the terminal 820 with a reference COUNT value of the PDCP layer used by the terminal 820 to receive data for MBS communication. By using the reference COUNT value configured by the base station 810, the terminal 820 may determine which HFN value to apply to which received packet. The reference COUNT value may be configured for each point-to-multipoint data radio bearer (PTM DRB) that is a DRB performing MBS communication. Also, when the reference COUNT value is not configured for a certain PTM DRB, the terminal may configure the initial value of HFN as 0 with respect to the certain PTM DRB. In another embodiment, when the initial RX_DELIV and RX_NEXT value is not configured for a certain PTM DRB, the terminal 820 may configure, with respect to the certain PTM DRB, the initial value of RX_NEXT as a remainder value after dividing a value, which is obtained by adding 1 to the sequence number of the packet first received in the PTM DRB, by the total sequence number size ($2^{\wedge}$(the number of bits of the sequence number size)). Also, the initial value of RX_DELIV may be configured as a remainder value after dividing a value, which is obtained by subtracting the half size of the PDCP reception window from the sequence number of the first received packet, by the total sequence number size ($2^{\wedge}$(the number of bits of the sequence number size)).

The reference COUNT may include a reference sequence number and an HFN value of the reference sequence number. For example, when the reference COUNT has a size of 32 bits and the reference sequence number has a size of 18 bits, the HFN value of the reference sequence number may have a size of 14 bits, which is obtained by subtracting 18 from 32. Also, for example, the HFN may be 14 most significant bits (MSBs), and the sequence number may be 18 least significant bits (LSBs). Also, for example, the COUNT value may be "($2^{\wedge}$(the number of bits of the sequence number size))*HFN+the sequence number". The reference COUNT value may be a value indicating which HFN value should be applied to which sequence number when the terminal 820 receives data for MBS communication.

The reference COUNT value received by the terminal 820 in operation 830 may be data for MBS communication by the terminal 820 and may be used to determine an HFN value of PDCP PDU (or PDCP SDU) first received in a radio bearer performing the MBS communication. For example, when the sequence number value of PDCP PDU (or PDCP SDU) first received in the radio bearer performing the MBS communication as data for MBS communication by the terminal 820 is x, a COUNT value having the closest distance to a reference COUNT among the COUNT values having the sequence number x value may be applied as a COUNT value of the PDCP PDU (or PDCP SDU). The terminal 820 may obtain an HFN value from the COUNT value of the first received PDCP PDU (or PDCP SDU) value described above.

For example, when the absolute value of a value obtained by subtracting <the sequence number of the first received PDCP PDU (or PDCP SDU)> from <the reference sequence number> is greater than or equal to 0 and less than the reordering window size, the terminal 820 may configure the HFN value of the first received PDCP PDU (or PDCP SDU) the same as the value of the reference HFN. Otherwise, when the absolute value of a value obtained by subtracting <the reference sequence number> from <the sequence number of the first received PDCP PDU (or PDCP SDU)> is greater than the reordering window size, the terminal 820 may configure the HFN value of the first received PDCP PDU (or PDCP SDU) as a value obtained by subtracting 1 from the reference HFN value. Otherwise, when the absolute value of a value obtained by subtracting <the sequence number of the first received PDCP PDU (or PDCP SDU)> from <the reference sequence number> is greater than the reordering window size, the terminal 820 may configure the HFN value of the first received PDCP PDU (or PDCP SDU) as a value obtained by adding 1 to the reference HFN value. When the difference between <the sequence number of the first received PDCP PDU (or PDCP SDU)> and <the reference sequence number> is equal to the reordering window size, the terminal 820 may apply a certain HFN value or apply a predetermined value.

The reference COUNT value received by the terminal 820 in operation 830 may be used to determine an initial HFN value of RX_DELIV. The sequence number value of RX_DELIV may be data for MBS communication by the terminal 820 and may be determined by the sequence number value of the first received PDCP PDU (or PDCP SDU). Also, when the determined sequence number value of RX_DELIV is x, a COUNT value having the closest distance to a reference COUNT among the COUNT values having the sequence number x value may be applied as a COUNT value of RX_DELIV. The terminal 820 may obtain the HFN value from the applied COUNT value of RX_DELIV.

For example, when the absolute value of a value obtained by subtracting <the sequence number of RX_DELIV> from <the reference sequence number> is greater than or equal to 0 and less than the reordering window size, the terminal 820 may configure the HFN value of RX_DELIV the same as the value of the reference HFN. Otherwise, when the value obtained by subtracting <the reference sequence number> from <the sequence number of RX_DELIV> is greater than the reordering window size, the terminal 820 may configure the HFN value of RX_DELIV as a value obtained by subtracting 1 from the reference HFN value. Otherwise, when the value obtained by subtracting <the sequence number of RX_DELIV> from <the reference sequence number> is greater than the reordering window size, the terminal 820 may configure the HFN value of RX_DELIV as a value obtained by adding 1 to the reference HFN value. When the difference between <the sequence number of RX_DELIV> and <the reference sequence number> is equal to the reordering window size, the terminal 820 may apply a certain HFN value or apply a predetermined value.

The reference COUNT value received by the terminal 820 in operation 830 may be used to determine an initial HFN value of RX_NEXT. The sequence number value of RX_NEXT may be data for MBS communication by the terminal 820 and may be determined by the sequence number value of the first received PDCP PDU (or PDCP SDU). Also, when the determined sequence number value of RX_NEXT is x, a COUNT value having the closest distance to a reference COUNT among the COUNT values having the sequence number x value may be applied as a COUNT value of RX_NEXT. The terminal 820 may obtain the HFN value from the applied COUNT value of RX_NEXT.

For example, when the absolute value of a value obtained by subtracting <the sequence number of RX_NEXT> from <the reference sequence number> is greater than or equal to 0 and less than the reordering window size, the terminal 820 may configure the HFN value of RX_NEXT the same as the value of the reference HFN. Otherwise, when the value obtained by subtracting <the reference sequence number> from <the sequence number of RX_NEXT> is greater than the reordering window size, the terminal 820 may configure the HFN value of RX_NEXT as a value obtained by subtracting 1 from the reference HFN value. Otherwise, when the value obtained by subtracting <the sequence number of RX_NEXT> from <the reference sequence number> is greater than the reordering window size, the terminal 820 may configure the HFN value of RX_NEXT as a value obtained by adding 1 to the reference HFN value. When the difference between <the sequence number of RX_NEXT> and <the reference sequence number> is equal to the reordering window size, the terminal 820 may apply a certain HFN value or apply a predetermined value.

The terminal 820 may obtain the initial HFN value by applying the reference count value received in operation 830 as described above in FIG. 8 and may receive data for MBS communication afterward by using the obtained initial HFN value. Thereafter, the terminal 820 may transmit, to the base station 810, a configuration completion report message indicating that the configuration of the reference count value has been accurately received and the received reference count value (or the initial HFN value obtained by using the reference count value) will be applied.

Figure 9:
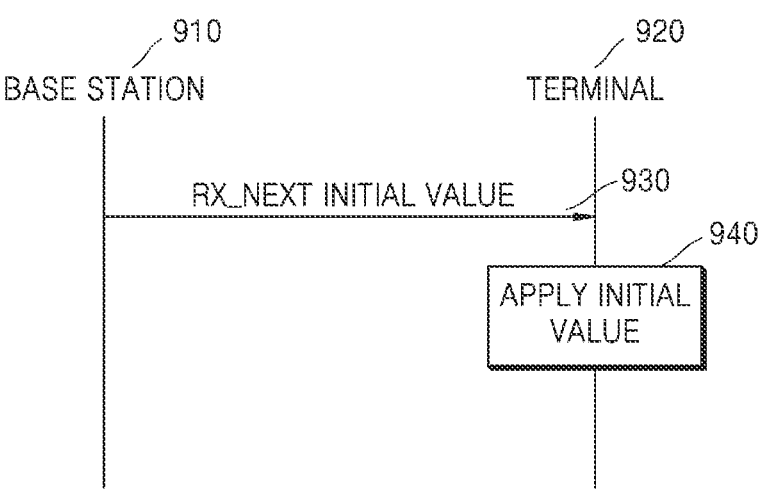
FIG. 9 illustrates a method by which a base station configures an initial value of a state variable for a terminal performing MBS communication, according to an embodiment of the present disclosure.

FIG. 9 illustrates a method by which a base station configures an initial value of a state variable for a terminal performing MBS communication, according to an embodiment of the present disclosure. When a terminal 920 intends to receive data for MBS communication or to change a configuration about data for MBS communication that is being received, a base station 910 may transmit configuration information about MBS communication to the terminal 920 to allow the terminal 920 to apply the configuration information about MBS communication. However, in some cases, the terminal 920 receiving the data for MBS communication may receive the data from the middle of the sequence number. Thus, by allowing the base station 910 to transmit, to the terminal 920, the initial value of a state variable to be used by the terminal 920 to receive data for MBS communication, it may be necessary to prevent an unintended packet loss and prevent a delay time increase due to packet reordering when the terminal 920 transmits/receives data from the middle of the packet. The method according to an embodiment of the present disclosure described with reference to FIG. 9 may prevent a packet loss and a delay time increase.

Referring to FIG. 9, in an embodiment of the present disclosure, in operation 930, the base station 910 may configure the terminal 920 with the initial value of RX_NEXT of the PDCP layer used by the terminal 920 to receive data for MBS communication. Because RX_NEXT is a state variable of the COUNT value, it may have an HFN portion and a sequence number portion. Also, the terminal 920 may configure an initial value of the RX_DELIV value as the same value as RX_NEXT.

According to an embodiment of the present disclosure, the initial value of RX_NEXT may be configured for each point-to-multipoint data radio bearer (PTM DRB) that is a DRB performing MBS communication. When the initial RX_NEXT value is not configured for a certain PTM DRB, the terminal 920 may configure the initial value of RX_NEXT as 0 with respect to the certain PTM DRB. In another embodiment, when the initial RX_DELIV and RX_NEXT value is not configured for a certain PTM DRB, the terminal 920 may configure, with respect to the certain PTM DRB, the initial value of RX_NEXT as a remainder value after dividing a value, which is obtained by adding 1 to the sequence number of the packet first received in the PTM DRB, by the total sequence number size (2^(the number of bits of the sequence number size)). Also, the initial value of RX_DELIV may be configured as a remainder value after dividing a value, which is obtained by subtracting the half size of the PDCP reception window from the sequence number of the first received packet, by the total sequence number size (2^(the number of bits of the sequence number size)). In operation 940, the terminal 920 may apply the RX_DELIV and RX_NEXT value received in operation 930 to receive data for MBS communication afterward. Thereafter, the terminal 920 may transmit, to the base station 910, a configuration completion report message indicating that the configuration of the initial value of the RX_NEXT has been accurately received and will be applied to the terminal 920.

Figure 10:
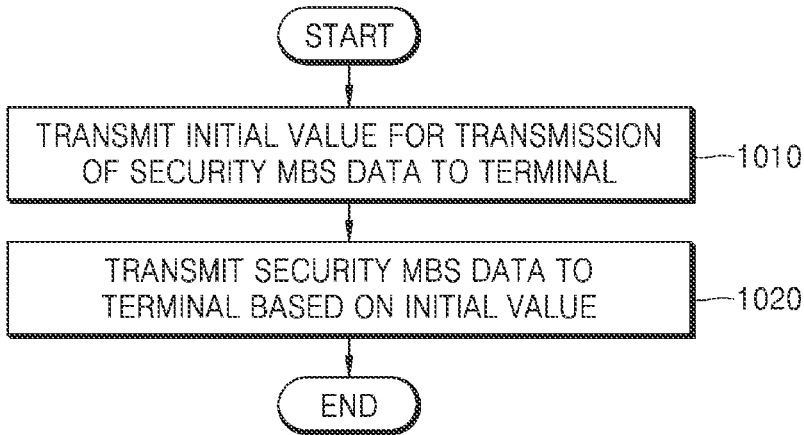
FIG. 10 is a flowchart illustrating a method by which a base station performs security MBS communication with a terminal, according to an embodiment of the present disclosure.

FIG. 10 is a flowchart illustrating a method by which a base station performs security MBS communication with a terminal, according to an embodiment of the present disclosure.

Referring to FIG. 10, in operation 1010, the base station may transmit an initial value for transmission of security MBS data to the terminal. The initial value may include at least one of an RX_DELIV value, an RX_NEXT value, a hyper frame number (HFN) value, or a reference COUNT value. Also, the base station may transmit the initial value to the terminal while multicasting or broadcasting the security MBS data to a plurality of terminals.

In operation 1020, the base station may transmit the security MBS data to the terminal based on the initial value transmitted to the terminal.

Figure 11:
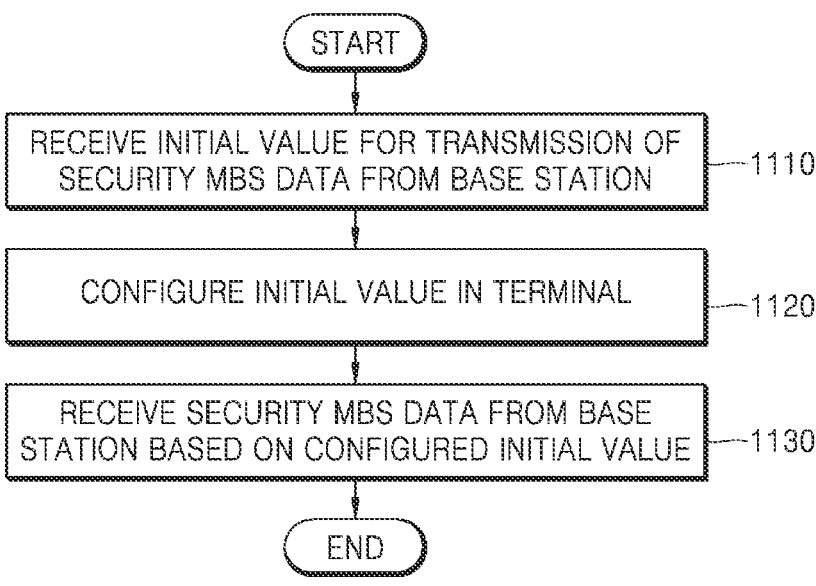
FIG. 11 is a flowchart illustrating a method by which a base station performs security MBS communication with a terminal, according to an embodiment of the present disclosure.

FIG. 11 is a flowchart illustrating a method by which a terminal performs security MBS communication with a base station, according to an embodiment of the present disclosure.

Referring to FIG. 11, in operation 1110, the terminal may receive an initial value for transmission of security MBS data from the base station. The initial value may include at least one of an RX_DELIV value, an RX_NEXT value, a hyper frame number (HFN) value, or a reference COUNT value. Also, the base station may transmit the initial value to the terminal while multicasting or broadcasting the security MBS data to a plurality of terminals. Also, the terminal may receive the initial value from the base station while the base station multicasts or broadcasts the security MBS data to a plurality of terminals.

In operation 1120, the terminal may configure the initial value received from the base station, in the terminal.

In operation 1130, the terminal may receive the security MBS data from the base station based on the configured initial value.

Figure 12:
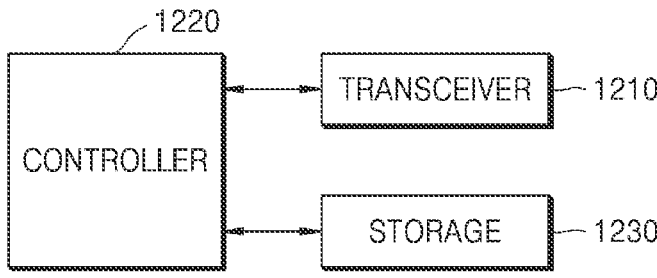
FIG. 12 is a diagram illustrating a structure of a base station according to an embodiment of the present disclosure.

FIG. 12 is a diagram illustrating a structure of a base station according to an embodiment of the present disclosure.

Referring to FIG. 12, the base station may include a transceiver 1210, a controller 1220, and a storage 1230. In the present disclosure, the controller 1220 may be defined as a circuit, an application-specific integrated circuit, or at least one processor. The transceiver 1210, the controller 1220, and the storage 1230 of the base station may operate according to the above communication method of the base station. However, the components of the base station are not limited thereto. For example, the base station may include more components or fewer components than the above components. In addition, the transceiver 1210, the controller 1220, and the storage 1230 may be implemented as a single chip.

The transceiver 1210 may exchange signals with other network entities. For example, the transceiver 1210 may transmit system information to the terminal and may transmit a synchronization signal or a reference signal thereto. The transceiver 1210 may collectively refer to a receiver and a transmitter of the base station and may exchange signals with a terminal or a network entity. The signals exchanged with the terminal or the network entity may include control information and data. For this purpose, the transceiver 1210 may include, for example, an RF transmitter for up-converting and amplifying a transmitted signal and an RF receiver for low-noise-amplifying and down-converting a received signal. However, this is merely an embodiment of the transceiver 1210, and the components of the transceiver 1210 are not limited to the RF transmitter and the RF receiver.

Also, the transceiver 1210 may receive a signal on a radio channel and output the signal to the controller 1220 and may transmit a signal output from the controller 1220, on a radio channel.

The controller 1220 may control an overall operation of the base station according to an embodiment of the present disclosure. For example, the controller 1220 may control a signal flow between the respective blocks to perform an operation according to the flowchart described above. The controller 1220 may receive a control signal and a data signal through the transceiver 1210 and process the received control signal and data signal. Also, the controller 1220 may transmit the processed control signal and data signal through the transceiver 1210. Also, the controller 1220 may configure downlink control information (DCI) including allocation information about a physical downlink shared channel (PDSCH) and control each component of the base station to transmit the DCI. The controller 1220 may include one or more controllers and may include one or more processors. The controller 1220 may control the components of the base station by executing the program stored in the storage 1230.

The storage 1230 may store at least one of information transmitted/received through the transceiver 1210 and information generated through the controller 1220. The storage 1230 may be defined as a 'memory'. The storage 1230 may store programs and data necessary for the operation of the base station. Also, the storage 1230 may store control information or data included in the signals obtained by the base station. The storage 1230 may include a storage medium or a combination of storage media such as ROM, RAM, hard disk, CD-ROM, and DVD. Also, the storage 1230 may not be separately provided and may be included in the controller 1220.

Figure 13:
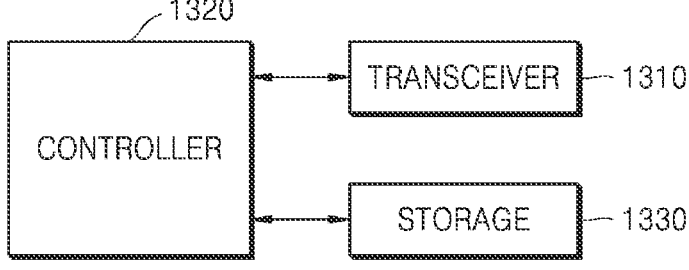
FIG. 13 is a diagram illustrating a structure of a terminal according to an embodiment of the present disclosure.

FIG. 13 is a diagram illustrating a structure of a terminal according to an embodiment of the present disclosure.

Referring to FIG. 13, the terminal may include a transceiver 1310, a controller 1320, and a storage 1330. In the present disclosure, the controller 1320 may be defined as a circuit, an application-specific integrated circuit, or at least one processor. The transceiver 1310, the controller 1320, and the storage 1330 of the terminal may operate according to the above communication method of the terminal. However, the components of the terminal are not limited thereto. For example, the terminal may include more components or fewer components than the above components. In addition, the transceiver 1310, the controller 1320, and the storage 1330 may be implemented as a single chip.

The transceiver 1310 may exchange signals with other network entities. For example, the transceiver 1310 may receive system information from the base station and may receive a synchronization signal or a reference signal therefrom. The transceiver 1310 may collectively refer to a receiver and a transmitter of the terminal and may exchange signals with a network entity, a base station, or another terminal. Also, the signals exchanged with the network entity, the base station, or the other terminal may include control information and data. For this purpose, the transceiver 1310 may include, for example, an RF transmitter for up-converting and amplifying a transmitted signal and an RF receiver for low-noise-amplifying and down-converting a received signal. However, this is merely an embodiment of the transceiver 1310, and the components of the transceiver 1310 are not limited to the RF transmitter and the RF receiver.

Also, the transceiver 1310 may receive a signal on a radio channel and output the signal to the controller 1320 and may transmit a signal output from the controller 1320, on a radio channel.

The controller 1320 may control an overall operation of the terminal according to an embodiment of the present disclosure. For example, the controller 1320 may control a signal flow between the respective blocks to perform an operation according to the flowchart described above. The controller 1320 may receive a control signal and a data signal through the transceiver 1310 and process the received control signal and data signal. Also, the controller 1320 may transmit the processed control signal and data signal through the transceiver 1310. Also, the controller 1320 may control the components of the terminal to receive the DCI including two layers to receive a plurality of PDSCHs simultaneously. The controller 1320 may include one or more controllers and may include one or more processors. The controller 1320 may control the components of the terminal by executing the program stored in the storage 1330.

The storage 1330 may store at least one of information transmitted/received through the transceiver 1310 and information generated through the controller 1320. The storage 1330 may be defined as a 'memory'.

It should be understood that the embodiments described herein should be considered in a descriptive sense only and not for purposes of limitation. That is, it will be understood by those of ordinary skill in the art that various changes in form and details may be made in the embodiments of the present disclosure without departing from the scope of the present disclosure. Also, the embodiments described above may be operated in combination when necessary. For example, the base station and the terminal may be operated according to a combination of portions of an embodiment and another embodiment of the present disclosure. Also, embodiments of the present disclosure may also be applied to other communication systems, and other modifications based on the technical spirit of the embodiments may also be implemented.

The invention claimed is:

1. A method performed by a user equipment (UE) in a wireless communication system, the method comprising:
   receiving, from a base station, configuration information for a multicast broadcast service (MBS), wherein the configuration information for the MBS includes an initial value of an RX_DELIV; and
   applying the initial value of the RX_DELIV to the RX_DELIV for a radio bearer for the MBS,
   wherein the RX_DELIV is a packet data convergence protocol (PDCP) state variable indicating a count value of a first packet not delivered to an upper layer.

2. The method of claim 1, further comprising applying 0 to the RX_DELIV for a radio bearer for a unicast service.

3. The method of claim 1, wherein the RX_DELIV includes a hyper frame number (HFN) and a sequence number (SN).

4. The method of claim 1, further comprising transmitting, to the base station, a configuration complete message indicating that the initial value of the RX_DELIV is applied.

5. A user equipment (UE) for use in a wireless communication system, the UE comprising:
   a transceiver; and
   at least one processor coupled with the transceiver and configured to:
      receive, from a base station, configuration information for a multicast broadcast service (MBS), wherein the configuration information for the MBS includes an initial value of an RX_DELIV; and
      apply the initial value of the RX_DELIV to the RX_DELIV for a radio bearer for the MBS,
   wherein the RX_DELIV is a packet data convergence protocol (PDCP) state variable indicating a count value of a first packet not delivered to an upper layer.

6. The UE of claim 5, wherein the at least one processor is further configured to apply 0 to the RX_DELIV for a radio bearer for a unicast service.

7. The UE of claim 5, wherein the RX_DELIV includes a hyper frame number (HFN) and a sequence number (SN).

8. The UE of claim 5, wherein the at least one processor is further configured to transmit, to the base station, a configuration complete message indicating that the initial value of the RX_DELIV is applied.

9. A method performed by a base station in a wireless communication system, the method comprising:
   transmitting, to a user equipment (UE), configuration information for a multicast broadcast service (MBS), wherein the configuration information for the MBS includes an initial value of an RX_DELIV,
   wherein the transmission of the initial value of the RX_DELIV causes the UE to apply the initial value of the RX_DELIV to the RX_DELIV for a radio bearer for the MBS, and
   wherein the RX_DELIV is a packet data convergence protocol (PDCP) state variable indicating a count value of a first packet not delivered to an upper layer.

10. The method of claim 9, wherein 0 is applied to the RX_DELIV for a radio bearer for a unicast service.

11. The method of claim 9, wherein the RX_DELIV includes a hyper frame number (HFN) and a sequence number (SN).

12. A base station for use in a wireless communication system, the base station comprising:

a transceiver; and at least one processor coupled with the transceiver and configured to transmit, to a user equipment (UE), configuration information for a multicast broadcast service (MBS), wherein the configuration information for the MBS includes an initial value of an RX_DELIV, wherein the transmission of the initial value of the RX_DELIV causes the UE to apply the initial value of the RX_DELIV to the RX_DELIV for a radio bearer for the MBS, and wherein the RX_DELIV is a packet data convergence protocol (PDCP) state variable indicating a count value of a first packet not delivered to an upper layer.

13. The base station of claim 12, wherein 0 is applied to the RX_DELIV for a radio bearer for a unicast service.

14. The base station of claim 12, wherein the RX_DELIV includes a hyper frame number (HFN) and a sequence number (SN).

* * * * *